(12) United States Patent
Kawai et al.

(10) Patent No.: US 8,043,712 B2
(45) Date of Patent: Oct. 25, 2011

(54) HEAT-SEALABLE MULTILAYER POLYPROPYLENE RESIN FILM AND PACKAGING MATERIAL

(75) Inventors: Kenji Kawai, Aichi (JP); Hirokazu Oogi, Aichi (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 11/912,978

(22) PCT Filed: Apr. 19, 2006

(86) PCT No.: PCT/JP2006/308187
§ 371 (c)(1),
(2), (4) Date: Jul. 3, 2008

(87) PCT Pub. No.: WO2006/118030
PCT Pub. Date: Nov. 9, 2006

(65) Prior Publication Data
US 2009/0068487 A1    Mar. 12, 2009

(30) Foreign Application Priority Data
Apr. 28, 2005  (JP) ................................. 2005-131758

(51) Int. Cl.
*B32B 27/32* (2006.01)
(52) U.S. Cl. ........................... 428/515; 428/516
(58) Field of Classification Search ............. 428/515, 428/516
See application file for complete search history.

(56) References Cited

U.S. PATENT DOCUMENTS
3,202,528 A    8/1965    James
(Continued)

FOREIGN PATENT DOCUMENTS
EP    0554450    8/1993
(Continued)

OTHER PUBLICATIONS
Machine translation—Kawai, JP 2004-345135, Dec. 2004.*
(Continued)

*Primary Examiner* — Hoa (Holly) Le
*Assistant Examiner* — Ronak Patel
(74) *Attorney, Agent, or Firm* — Morrison & Foerster LLP

(57) ABSTRACT

[Problem] Provision of a heat-sealable multilayer polypropylene-based resin film having heat seal strength sufficient for packaging a heavy article and tight-sealing property, and a packaging material using the film.
[Solving means] A heat-sealable multilayer polypropylene-based resin film comprising a crystalline polypropylene-based resin and a propylene-α-olefin copolymer, which is an oriented polypropylene-based resin film made of a laminate of 3 or more layers of a substrate layer having a melting point of 155° C. or less, an intermediate layer and a thermal adhesion layer having a melting point of 150° C. or less, wherein the intermediate layer has a xylene-soluble content of 2.5% or less, the substrate layer has a melting point higher than that of the intermediate layer, and the intermediate layer has a thickness of 4 μm or above.

6 Claims, 1 Drawing Sheet

U.S. PATENT DOCUMENTS

| | | | |
|---|---|---|---|
| 4,384,024 | A | 5/1983 | Mitchell et al. |
| 4,726,999 | A | 2/1988 | Kohyama et al. |
| 4,822,840 | A | 4/1989 | Kioka et al. |
| 5,049,436 | A | 9/1991 | Morgan et al. |
| 5,376,437 | A | 12/1994 | Kawakami et al. |
| 5,888,648 | A | 3/1999 | Donovan et al. |
| 6,001,293 | A | 12/1999 | Wakamatsu et al. |
| 6,326,068 | B1 | 12/2001 | Kong et al. |
| 6,326,080 | B1 * | 12/2001 | Okayama et al. ............. 428/327 |
| 6,458,470 | B1 | 10/2002 | DeLisio et al. |
| 2002/0164470 | A1 | 11/2002 | Bader |
| 2007/0292640 | A1 | 12/2007 | Kawai et al. |
| 2008/0003386 | A1 | 1/2008 | Kawai et al. |

FOREIGN PATENT DOCUMENTS

| | | |
|---|---|---|
| JP | 05-229080 | 9/1993 |
| JP | 07-117124 | 5/1995 |
| JP | 09-207294 | 8/1997 |
| JP | 10-076618 | 3/1998 |
| JP | 11-348205 | 12/1999 |
| JP | 2000-85073 | 3/2000 |
| JP | 2002-154188 | 5/2002 |
| JP | 2002-240210 | 8/2002 |
| JP | 2003-225979 | 8/2003 |
| JP | 2003-291282 | 10/2003 |
| JP | 2004-345135 | 12/2004 |
| JP | 2004-345136 | 12/2004 |
| JP | 2004-351749 | 12/2004 |
| JP | 2005-088522 | 4/2005 |
| JP | 2005088522 A * | 4/2005 |
| WO | WO-01/34390 | 5/2001 |

OTHER PUBLICATIONS

Machine Translation—Mogami JP 2000-085073, Mar. 2000.*
International Search Report, mailed on Jul. 25, 2006, directed to International Application No. PCT/JP2006/308187. 2 pages.
European Search Report mailed on Mar. 11, 2009 directed towards counterpart foreign application No. 06732094.5; 3 pages.
Michael Mullan and Derek McDowell (2003). "Modified Atmosphere Packaging" Chapter 10 in *Food Packaging Technology*, Ed. Coles et al., CRC Press, pp. 303-339.
Kawai et al., U.S. Office Action mailed Oct. 15, 2009, directed to U.S. Appl. No. 10/593,237; 5 pages.
Kawai et al., U.S. Office Action mailed Jan. 12, 2010, directed to U.S. Appl. No. 10/594,057; 13 pages.
Kawai, K et al. U.S Office Action mailed on Mar. 16, 2010 directed at application No. 10/593,237; 7 pages.
Kawai, K. et al., U.S. Office Action mailed Jun. 23, 2010, directed to U.S. Appl. No. 10/594,057; 12 pages.
Kawai et al., U.S. Office Action mailed Jan. 4, 2011, directed to U.S. Appl. No. 10/594,057; 15 pages.
Kawai et al., U.S. Office Action mailed Jun. 6, 2011, directed to U.S. Appl. No. 10/594,057; 16 pages.
Chodák, Ivan. (1999). "Crosslinking of polypropylene," In *Polypropylene: An A-Z Reference*. J. Karger-Kocsis ed., Kluwer Publishers, Dordrecht, pp. 128-134.

* cited by examiner

HEAT-SEALABLE MULTILAYER POLYPROPYLENE RESIN FILM AND PACKAGING MATERIAL

TECHNICAL FIELD

The present invention relates to a heat-sealable multilayer polypropylene-based resin film and packaging material. More particularly, it relates to a heat-sealable multilayer polypropylene-based resin film having heat seal strength sufficient for packaging heavy articles, which can be preferably used for automatic filling and packaging requiring tight-sealing property, and a packaging material using said laminate.

BACKGROUND ART

Conventionally, in general, a coextruded polypropylene-based resin laminate film wherein a polyolefin-based resin having a low melting point is laminated on a polypropylene-based resin, and a polypropylene-based resin laminate film, wherein an unoriented polyethylene-based resin film or polypropylene-based resin film and an oriented polypropylene-based resin film are laminated, have been frequently used as heat-sealable films used for packaging. However, a coextruded polypropylene-based resin laminate film wherein a polyolefin-based resin having a low melting point is laminated on a polypropylene-based resin has a certain level of seal strength but does not have a seal strength enabling packaging of a heavy article such as a water product and the like. A polypropylene-based resin laminate film, wherein an unoriented polyethylene-based resin film or polypropylene-based resin film and an oriented polypropylene-based resin film are laminated, has sufficient seal strength but requires a laminating step using an organic solvent and the like, and therefore, is unpreferable in view of the economical aspect and an influence on the global environment.

In addition, as a method for improving the seal strength of the coextruded polypropylene-based resin laminate film, an embodiment using a polypropylene-based resin as a substrate layer and a linear low density polyethylene-based resin as a heat-sealable layer has been reported (e.g., see patent reference 1). However, since a heterologous material is laminated, it has a weak interlayer strength, and a sufficient heat seal strength desired by the present invention cannot be obtained.
patent reference 1: JP-A-9-207294

Moreover, forming an adhesion layer between a polypropylene-based resin layer and a linear low-density polyethylene-based resin layer has been reported (e.g., see patent reference 2). However, since a polyethylene-based resin is laminated, the film loses elasticity, which causes difficulty in the handling during bag making processing and after filling the contents.
patent reference 2: JP-A-10-76618

In addition, it has been reported that sufficient seal strength can be obtained by defining the MFR (melt flow rate) of the resins to be used for the respective layers (e.g., see patent reference 3). However, this alone is not sufficient to ensure satisfactory tight-sealing property of the sealed part during automatic packaging, and this method is unsuitable for use requiring tight-sealing property of the sealed part.
patent reference 3: JP-A-2003-225979

DISCLOSURE OF THE INVENTION

Figure 1:
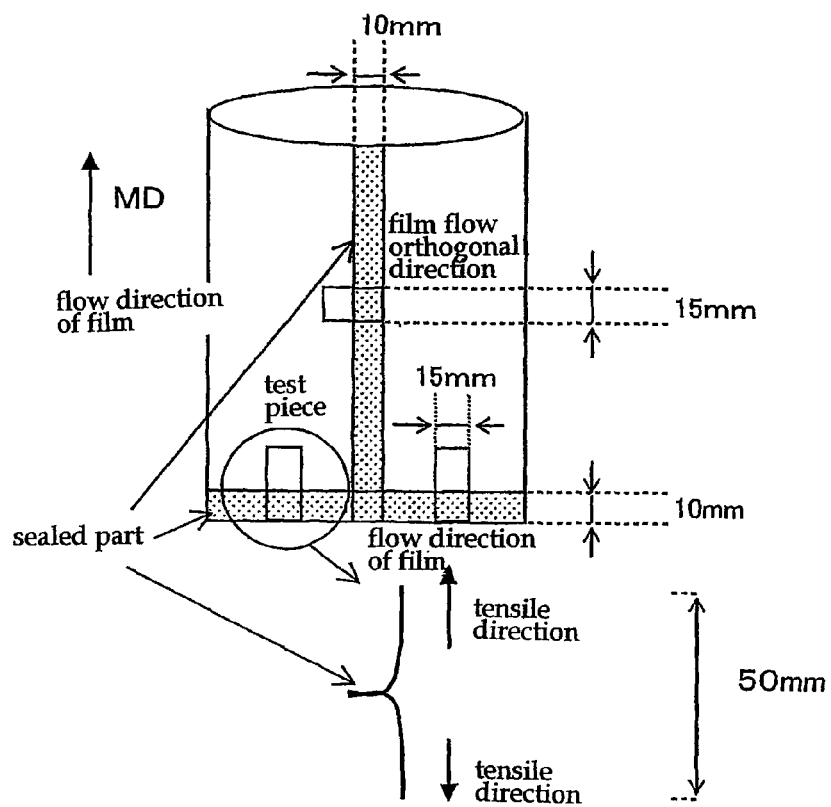
FIG. 1 A schematic showing of the shape of the bag prepared in Example and a test piece for the measurement of heat seal strength.
Figure 2:
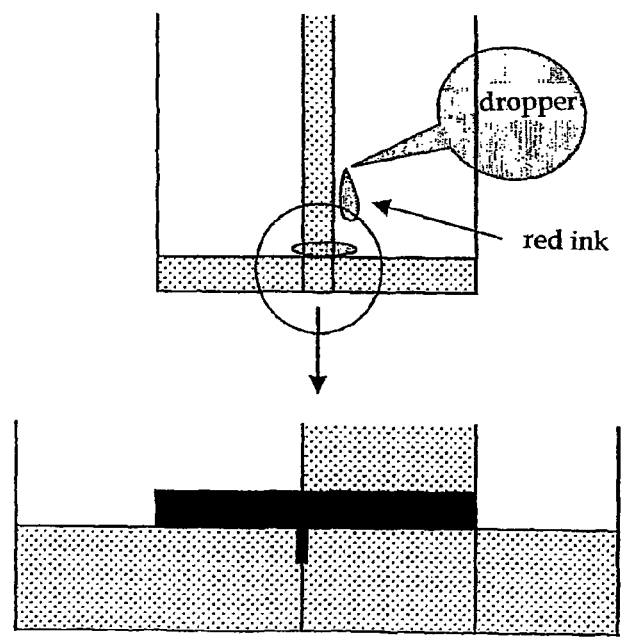
FIG. 2 A schematic showing of a tight-sealing property evaluation method.

Problems to be Solved by the Invention

The present invention aims to solve the problems that the above-mentioned conventional multilayer polypropylene-based films have and provide a heat-sealable polypropylene-based resin laminate film having a heat seal strength sufficient for packaging heavy goods and tight-sealing property, and a package made of such film.

Means of Solving the Problems

To achieve the above-mentioned object, the heat-sealable multilayer polypropylene-based resin film of the present invention comprises a crystalline polypropylene-based resin and a propylene-α-olefin copolymer, which is an oriented polypropylene-based resin film made of a laminate of 3 or more layers of a substrate layer having a melting point of 155° C. or less, an intermediate layer and a thermal adhesion layer having a melting point of 150° C. or less, wherein the substrate layer has a melting point higher than that of the intermediate layer, and the intermediate layer has a xylene-soluble content of 2.5% or less and a thickness of 4 μm or above.

The heat-sealable multilayer polypropylene-based resin film of the present invention having the above-mentioned constitution has heat seal strength sufficient for packaging heavy goods and can be preferably used for application requiring tight-sealing property.

In this case, moreover, it is preferable to add a resin used for the thermal adhesion layer to the aforementioned substrate layer and the intermediate layer in not less than 5 wt %.

In this case, furthermore, it is preferable that the aforementioned film be biaxially oriented.

In this case, moreover, a packaging using the aforementioned film is a preferable mode of use.

Effect of the Invention

The heat-sealable laminate of the present invention has sufficient heat seal strength for packaging heavy goods as a matter of course, is superior in handling property and shows good tight-sealing property. Thus, the film is preferably used as a packaging material for cereals such as wheat flour, rice, wheat and the like; root vegetables such as potato, radish, carrot and the like; plate or string konjacs; various pickles such as pickled radish, vegetables pickled in soy sauce or sake lees and the like; various bean pastes; jacket materials (e.g., concentrated soup, soup for Japanese noodle, soy sauce, sauce, ketchup, mayonnaise and the like); and collective package for packing several packages of Chinese noodle and the like together.

Moreover, the laminate film of the present invention can also be used as a packaging material for paper carton, tube, bag, cup, standing pack, tray and the like.

BEST MODE FOR EMBODYING THE INVENTION

The embodiments of the heat-sealable multilayer polypropylene-based resin film and the packaging material of the present invention are explained below.

The heat-sealable multilayer polypropylene-based resin film of the present invention is preferable a film having three or more layers comprising a substrate layer, a thermal adhesion layer, and an intermediate layer formed between the substrate layer and the thermal adhesion layer.

The substrate layer is preferably made of two or more kinds of resins of a crystalline polypropylene-based resin and a copolymer of propylene and other α-olefin. As the crystalline polypropylene-based resin to be used for the substrate layer of the laminate film of the present invention, n-heptane-insoluble isotactic propylene homopolymer or a copolymer of polypropylene comprising 70 wt % or more of propylene and other α-olefin, which are used for general extrusion forming and the like suffices for use.

The n-heptane insolubility is an index of the crystallinity of polypropylene, which simultaneously indicates safety when used for packaging of food. In the present invention, use of one meeting the n-heptane insolubility (elution of not more than 150 ppm by extraction at 25° C. for 60 min [30 ppm or below when temperature in use exceeds 100° C.]) according to the Notice No. 20, February 1982, by the Ministry of Health and Welfare is a preferable embodiment.

As the α-olefin copolymerizable component of the copolymer of propylene and other α-olefin, α-olefin having 2 to 8 carbon atoms, for example, ethylene, butene-1, pentene-1, hexene-1, 4-methyl-1-pentene and the like, is preferable. Here, the copolymer is preferably a random or block copolymer obtained by polymerizing propylene and one or more kinds of α-olefins exemplified above.

The content of the copolymer of propylene and other α-olefin in the substrate layer is not less than 15 wt %, and a preferable range is desirably not less than 20 wt % and not more than 50 wt %, and the melting point is preferably 155° C.-148° C. When it is less than 20 wt %, unpreferably, sufficient tight-sealing property may not be afforded, and when it exceeds 50 wt %, unpreferably, the elasticity is lost and the handling performance sometimes becomes insufficient.

The melt flow rate (MFR) is, for example, within the range of 0.1-100 g/10 min, preferably 0.5-20 g/10 min, more preferably 1.0-10 g/10 min, for both the crystalline polypropylene-based resin and the copolymer of propylene and other α-olefin.

In addition, the resin to be used for the thermal adhesion layer of the heat-sealable multilayer polypropylene-based resin film of the present invention is a thermoplastic resin having a melting point of not more than 150° C., which is preferably a random copolymer or block copolymer obtained by polymerizing two or more kinds selected from α-olefin-based monomers having 2 to 10 carbon atoms, such as ethylene, propylene, butene, pentene, hexene, octene, decene and the like, where the copolymers can be used alone or in combination. In this case, one having a higher MFR is preferable in terms of tight-sealing property and elasticity, as well as handling performance.

As used herein, as the particularly preferable resin constituting a thermal adhesion layer, one containing a propylene-butene copolymer having a high butene content is preferable, where the butene content of the propylene-butene copolymer is preferably not less than 20 wt %. While the upper limit of the butene content is not particularly limited, it can be appropriately determined within the range free of defects, since too much butene content produces a sticky film surface and may degrade slip property and resistance to blocking. As the above-mentioned propylene-butene copolymer having a high butene content, for example, "SPX78J1" manufactured by Sumitomo Chemical Co., Ltd., "XR110H" manufactured by Mitsui Chemicals, Inc. and the like can be mentioned.

The above-mentioned propylene-butene copolymer is preferably contained in a proportion of not less than 65 wt % of the resin component constituting the thermal adhesion layer. It is more preferably not less than 70 wt % and not more than 99 wt %, and more preferably not more than 95 wt %. When the above-mentioned propylene-butene copolymer content is too small, the melt adhesion during sealing is degraded and tight-sealing property may not be easily afforded during automatic packaging. When it is too high, the interlayer strength with the intermediate layer may be degraded.

Moreover, the melting point of the thermoplastic resin forming the thermal adhesion layer is desirably set to not more than 150° C., preferably 60-150° C. In this way, the heat-sealable laminate can have sufficient heat seal strength. When the thermoplastic resin forming the thermal adhesion layer has a melting point of less than 60° C., the heat resistance of the heat-sealed part becomes poor and when it exceeds 150° C., improvement of the heat seal strength cannot be expected.

MFR is within the range of, for example, 0.1-100 g/10 min, preferably 0.5-20 g/10 min, more preferably 1.0-10 g/10 min.

Besides these, it is desirable that the heat-sealable multilayer polypropylene-based resin film of the present invention preferably have an intermediate layer formed between the substrate layer and the thermal adhesion layer, which comprises a propylene-α-olefin copolymer in a proportion exceeding 50 wt %, more preferably within the range of 60 wt % to 100 wt %. When the content of the propylene-α-olefin copolymer is 50 wt % or less, the tight-sealing property unpreferably becomes insufficient.

While the propylene-α-olefin copolymer used here is not particularly limited, it is preferably a propylene-α-olefin copolymer having a cold xylene-soluble (CXS) content of not more than 3 wt %. When a propylene-α-olefin copolymer having a cold xylene-soluble (CXS) content exceeding 3 wt % is used, the elasticity tends to decrease unpreferably.

The α-olefin copolymer is superior in the mechanical strength such as impact strength, tear property and the like, low temperature property, weather resistance and the like. Addition of this component affords superior properties of the laminate film. However, since α-olefin copolymer has a structure wherein heterologous α-olefin, as a second or third component, is randomly introduced into the main component of α-olefin molecular chain, crystallization is suppressed, and the crystallinity becomes low as compared to α-olefin homopolymers such as homopolypropylene and the like, wherein the addition of the α-olefin copolymer results in decreased elasticity of the film.

It is preferable to form an intermediate layer comprising 50 wt % or more of a propylene-α-olefin copolymer having a cold xylene-soluble (CXS) content of 3 wt % or less. It is more preferably 65-95 wt %, particularly preferably 65-80 wt %.

In this case, the cold xylene-soluble (CXS) content of the whole intermediate layer including that of other(s), for example, crystalline polypropylene-based resin to be used is preferably not more than 2.5 wt %, more preferably not more than 2.4 wt %, still more preferably not more than 2.2 wt %.

In addition, the melt flow rate (MFR) of the resin to be used for the intermediate layer is, for example, within the range of 0.1-100 g/10 min, preferably 0.5-20 g/10 min, more preferably 1.0-10 g/10 min. In this case, higher MFR is preferable from the aspects of tight-sealing property, elasticity and handling performance.

The above-mentioned "cold xylene-soluble content" refers to the amount of the amorphous part in the α-olefin copolymer and "cold xylene-soluble content is not more than 3 wt %" means an α-olefin copolymer having high crystallinity and less amorphous part.

As used herein, the cold xylene-soluble content is obtained by completely dissolving a sample (1 g) in boiling xylene (100 ml), cooling the mixture to 20° C., leaving the mixture for 4 hr, filtrating the mixture into a precipitate and a solution, evaporating the filtrate to dryness, drying same under reduced pressure at 70° C., measuring the weight and calculating the wt %.

As the above-mentioned α-olefin having a cold xylene-soluble content of not more than 3 wt %, polymers synthesized by the continuous gas phase polymerization described in JP-A-2003-277412 can be mentioned and, for example, "FSX66E8" (manufactured by Sumitomo Chemical Co., Ltd.) can be used.

As the thickness constitution of each layer of the heat-sealable multilayer polypropylene-based resin film of the present invention, the intermediate layer is desirably set to not less than 4 μm, preferably the range of 5 μm to 40 μm. A thickness of less than 4 μm is unpreferable because the adhesive force becomes weak and sufficient seal strength cannot be achieved, and moreover, the tight-sealing property becomes uneven. A thickness exceeding 40 μm is unpreferable because the film lacks elasticity, uniform stretching becomes difficult, and the thickness sometimes becomes inconsistent. While the thickness of the substrate layer and the thermal adhesion layer is not particularly limited, the substrate layer is preferably set to the range of 30-89% of the total layer thickness, and the thermal adhesion layer is preferably set to the range of 1-20%. As a more preferable range, the substrate layer is preferably set to 40-83.5%, and the thermal adhesion layer is preferably set to 1.5-15%, of the total layer thickness. Here, when the layer thickness of the substrate layer is less than 30%, and the layer thickness of the thermal adhesion layer exceeds 20%, the elasticity tends to decrease, which is unpreferable for handling of the products. In addition, when the layer thickness of the substrate layer exceeds 89%, and the layer thickness of the thermal adhesion layer is less than 1%, the object seal strength and tight-sealing property are sometimes unpreferably unavailable.

On the other hand, the thickness of the thermal adhesion layer is preferably not less than 0.8 μm, more preferably it is desirably set to the range of 0.9 μm to 6 μm. A thickness of less than 0.8 μm is unpreferable because the seal strength and tight-sealing property become insufficient, and a thickness exceeding 6 μm is unpreferable for handling of the product because elasticity is lost and the problems of slipping failure and blocking are developed.

The intermediate layer of the heat-sealable multilayer polypropylene-based resin film of the present invention preferably contains a resin used for the thermal adhesion layer in a proportion of not less than 5 wt %, more preferably not less than 8 wt %, and preferably not more than 30 wt %. Here, a content of the resin to be used for the thermal adhesion layer of less than 5 wt % is unpreferable because the tight-sealing property becomes insufficient, and a content exceeding 30 wt % is unpreferable because elasticity of the film is lost and handling performance of the product becomes poor and, moreover, when the films are superposed, they themselves may cause blocking, sometimes making the release of the film difficult.

Moreover, the substrate layer of the heat-sealable multilayer polypropylene-based resin film of the present invention preferably has a higher melting point than that of the intermediate layer. It is more preferably within the range of 140° C. to 155° C. When the melting point of the substrate layer is lower than that of the intermediate layer, the elasticity of the film as a whole becomes weak and the handling of the product sometimes becomes difficult. On the other hand, the melting point of the intermediate layer is desirably within the range of 130° C. to 150° C. When the melting point exceeds this range, the tight-sealing property sometimes becomes insufficient, thus being unpreferable, since the whole film becomes stiff. When it is lower than this range, the elasticity of the film as a whole becomes weak, which may unpreferably pose problems in the handling of the product.

In the present invention, the resin forming each layer may contain, where necessary, various additives, or fillers, for example, heat stabilizer, antioxidizing agent, light stabilizer, antistatic agent, lubricant, nucleating agent, flame-retardant, pigment, dye, calcium carbonate, barium sulfate, magnesium hydroxide, mica, talc, clay, zinc oxide, magnesium oxide, aluminum oxide, antibacterial agent, antifog agent, additive permitting natural decomposition performance and the like, as long as the property of each layer is not impaired. Furthermore, other thermoplastic resin, thermoplastic elastomer, rubbers, hydrocarbon resin, petroleum resin and the like may be added as long as the property of the film of the present invention is not impaired.

The heat-sealable multilayer polypropylene-based resin film of the present invention can be produced in any manner by a method known per se and the production method is not particularly limited. For example, after melt lamination using an extruder suitable for the number of lamination by a T die method, an inflation method and the like, a laminate film is produced by cooling by a cool roll method, a water cooling method, or an air cooling method, and stretched by a sequential biaxial orientation, a simultaneous biaxial orientation, a tubular orientation process and the like. Here, according to exemplary conditions for producing by a stepwise biaxial stretching method, a resin is melt-extruded from a T-shaped die and cooled and solidified in a casting machine to give an original sheet. At this time, the roll temperature for melt-casting is preferably set to the range of 15° C.-40° C. to suppress crystallization of the resin and to improve the transparency. Then, the original sheet is heated to a temperature suitable for stretching, and stretched in the flow direction of the sheet utilizing the difference in speed between stretching rolls, where the stretch ratio is preferably set within the range of 3-fold to 6-fold in consideration of stable production without uneven stretching. Then, the both edge portions of the longitudinally stretched sheet are held with tenter clips and stretched while sequentially spreading in the perpendicular direction relative to the flow of the sheet with heating to a temperature suitable for stretching with heated air. The transverse stretch ratio at this time is preferably set within the range of 7-fold to 10-fold in consideration of thickness variation and productivity.

In the heat-sealable multilayer polypropylene-based resin film of the present invention, the same kind of a polypropylene-based resin layer or other resin layer, for example, a resin layer with gas barrier property such as ethylene-vinyl acetate copolymer saponified product, polyvinyl alcohol and the like may be further laminated on the surface of the substrate layer. In addition, similar lamination between the substrate layer and the intermediate layer, or the intermediate layer and the thermal adhesion layer is not particularly limited as long as the property thereof is not impaired.

The heat-sealable multilayer polypropylene-based resin film of the present invention can be subjected to a surface treatment as necessary so long as the characteristics of the present invention are not inhibited. Examples of the method of the surface treatment include, but are not particularly limited to, corona discharge treatment, plasma treatment, flame treatment, acid treatment and the like. Sequential treatment is possible, and corona discharge treatment, plasma treatment and flame treatment are preferably applied, which can be easily performed before the winding process in the production process of the film. As a means to improve wetting tension of the surface of the thermal adhesion layer, a corona discharge treatment is particularly preferable. According to the use and as long as the property of the present invention is not inhibited, moreover, the film can be subjected to a special processing such as perforation processing and the like. The film can be perforated in 1-5000 μm and used as a freshness maintenance package for fruits and vegetables and the like.

EXAMPLES

The embodiments of the present invention are explained in more detail in the following by referring to Examples. The present invention is not limited by the following Examples as long as it does not depart from the gist of the present invention. The properties in the present specification were evaluated by the following methods.
(Melting Point Tm)
According to JIS K7121, the measurement was performed using a differential scanning calorimeter (DSC). For state conditioning, the temperature was raised from room temperature to 200° C. at 30° C./min, maintained at 200° C. for 5 min, decreased to −100° C. at 10° C./min, maintained at −100° C. for 5 min and, for the measurement of endothermic curve, the temperature was raised from −100° C. to 200° C. at 10° C./min.

When plural melting peaks are present, the melting peak at the maximum temperature was used as the melting point.
(Cold Xylene-Soluble Content)
The cold xylene-soluble content refers to one obtained by completely dissolving a sample (1 g) in boiling xylene (100 ml), cooling the mixture to 20° C., leaving the mixture for 4 hr, filtrating the mixture into a precipitate and a solution, evaporating the filtrate to dryness, drying same under reduced pressure at 70° C., measuring the weight and calculating the wt %.

Each layer is scraped off from the film to give each sample.
(Heat Seal Strength)
A sample cut out from the heat-sealable multilayer polypropylene-based resin film obtained in the following experiments in such a manner that the flow direction of the film is the length direction of a bag was heat sealed (seal width: 10 mm) (central principal rafter seal shape) to form a center press seal bag with a size of 185 mm×255 mm such that a sectional sealed part of the bag is T-shaped, as shown in FIG. 1. The heat sealing was performed under the conditions of seal temperature 150° C., pressure 196 kPa (2 Kg/cm², and heat sealing time 2 sec using a sealer "Test Sealer" manufactured by NISHIBE KIKAI CO., LTD.

A test piece (width 15 mm, length 50 mm) was cut out from a sealed part parallel to each of the length direction (MD) and width direction (TD) of the obtained bag. Then, the test piece was left standing in an atmosphere of temperature 20° C. and humidity 65% RH for 24 hr. Using "TENSILON" (UTM-IIIL) manufactured by Toyo Seiki Seisaku-sho, LTD., the strength by peeling at 180 degrees at a distance between chucks of 20 mm (held at 10 mm from heat sealed part) and a speed of 200 mm/min (chart speed 200 mm/min) was measured and taken as a heat seal strength (N/15 mm). FIG. 1 shows the shape of the bag formed and a schematic view of the test piece for the measurement of the heat seal strength.

(Tight-Sealing Property)
Using a bag prepared in the same manner as in the above-mentioned measurement of the heat seal strength, red ink manufactured by CHUGAI KASEI CO. LTD., RECORDER INK, was dropped from the inside of the bag onto the layered sealed parts in the length direction (MD) and the width direction (TD), and penetration to the outer side of the bag was evaluated.
○: Ink puddle was formed inside the bag, without penetration to sealed part; no leakage to the outside of the bag.
Δ: Ink penetrated to the sealed part but did not leak to the outside of the bag.
x: Ink leaked to the outside of the bag.
(Product Handling Performance)
About 4 g of rice confectionery (size 25 mm×75 mm) twist wrapped with a polyethylene film with a thickness of 25 μm and a size of 80 mm×140 mm was placed in a bag prepared in the same manner as in the above-mentioned measurement method of the heat seal strength, and the product handling performance was evaluated.

Evaluation grade 5: Film is elastic, and box packing, unboxing and display work can be easily done.
Evaluation grade 4: Bag is somewhat weak when carried, but the work can be done without problems.
Evaluation grade 3: Bag lacks elasticity, is felt weak in hands and the work is somewhat difficult to perform.
Evaluation grade 2: Bag lacks elasticity, is felt weak in hands and the work is difficult to perform.
Evaluation grade 1: Bag completely lacks elasticity and the work is difficult to perform.

The resins constituting each layer used in the following Production Examples were as follows.
Propylene homopolymer-1: "FS2011DG3" manufactured by Sumitomo Chemical Co., Ltd., MFR: 2.5 g/10 min, melting point: 158° C., cold xylene-soluble (CXS) content: 3.3 wt %
Propylene homopolymer-2: "WF836DG3" manufactured by Sumitomo Chemical Co., Ltd., MFR: 7.6 g/10 min, melting point: 158° C., cold xylene-soluble (CXS) content: 3.3 wt %
Propylene-ethylene-butene random copolymer-1: "FSX66E8" manufactured by Sumitomo Chemical Co., Ltd., ethylene content: 2.5 mol %, butene content: 7 mol %, MFR: 3.1 g/10 min, melting point: 133° C., cold xylene-soluble (CXS) content: 1.6 wt %
Propylene-butene copolymer-1: "SPX78J1" manufactured by Sumitomo Chemical Co., Ltd., butene content: 25 mol %, MFR: 9.0 g/10 min, melting point: 128° C., cold xylene-soluble (CXS) content: 14.0 wt %
Propylene-butene copolymer-2: "XR110H" manufactured by Mitsui Chemical Co., Ltd., MFR: 6.0 g/10 min, melting point: 110° C.

Example 1

Production Method of Heat-Sealable Multilayer Polypropylene-Based Resin Film

Using three melt extruders, in the first extruder, 2000 ppm of organic polymer fine particles (blend of CS11: manufactured by Sumitomo Chemical Co., Ltd., particle size 1.1 μm and CS18: manufactured by Sumitomo Chemical Co., Ltd., particle size 1.8 μm at 5:1) was added to a resin mixture of 70 wt % of propylene homopolymer-1 (density 0.90 g/cm³, MFR 2.5 g/10 min, melting point 158° C., cold xylene-soluble content 3.3 wt %), and 30 wt % of propylene-ethylene-butene random copolymer-1 (density 0.89 g/cm³, MFR 3.1 g/10 min, melting point 133° C., cold xylene-soluble content 1.6 wt %) to give substrate layer A, in the second extruder, 1500 ppm of inert fine particles (blend of Sylysia 350: manufactured by Fuji Silysia Chemical Ltd., particle size 1.8 μm, CUBE50KAS: manufactured by MARUO CALCIUM CO., LTD., particle size 5.5 μm, and CUBE80KAS: manufactured by MARUO CALCIUM CO., LTD., particle size 8.5 μm at 10:2:1) was added to 100 wt % of propylene-butene random copolymer-1 (density 0.89 g/cm$^3$, MFR 9.0 g/10 min, melting point 128° C., cold xylene-soluble portion 14.0 wt %) to give thermal adhesion layer C, in the third extruder, a resin mixture of 90 wt % of propylene-ethylene-butene random copolymer-1 (density 0.89 g/cm$^3$, MFR 3.1 g/10 min, melting point 133° C., cold xylene-soluble content 1.6 wt %) and 10 wt % of propylene homopolymer-1 (density 0.90 g/cm$^3$, MFR 2.5 g/10 min, melting point 157° C., cold xylene-soluble content 3.3 wt %) was prepared as layer B to be present between the substrate layer and the thermal adhesion layer, they were melt-coextruded by the T die method to form A/B/C in the die, cool-solidified on a chill roll at 20° C., and stretched 4.5-fold longitudinally and 8-fold transversely to give a multilayer film wherein the thickness of A/B/C structure was 28 μm, 5 μm and 2 μm, respectively.

Each surface of the substrate layer A and thermal adhesion layer C of the obtained heat-sealable film was subjected to a corona discharge treatment, whereby a heat-sealable multilayer polypropylene-based resin film wherein the surface of the substrate layer A had a wetting tension of 40 mN/m and the surface of the thermal adhesion layer C had a wetting tension of 39 mN/m, after the corona discharge treatment was obtained. Table 1 shows evaluation results. The obtained heat-sealable multilayer polypropylene-based resin film had sufficient heat seal strength, elasticity and tight-sealing property, and both of handling performance and the product protection performance were superior.

Comparative Example 1

In the same manner as in Example 1 except that 100 wt % of propylene homopolymer-1 was used as a resin of substrate layer A, a heat-sealable multilayer polypropylene-based resin film was obtained. The obtained multilayer film had poor tight-sealing property and the product protection performance was insufficient.

Comparative Example 2

In the same manner as in Example 1 except that 45 wt % of propylene homopolymer-1 and 55 wt % of propylene-ethylene-butene random copolymer-1 were used as resins of substrate layer A, 50 wt % of propylene homopolymer-2 and 50 wt % of propylene-ethylene-butene random copolymer-1 were used as resins of intermediate layer B, 50 wt % of propylene-butene random copolymer-1 and 50 wt % of propylene-butene random copolymer-2 were used as resins of thermal adhesion layer C, and the thickness of each of the A/B/C structure was 30 μm, 4 μm and 1 μm, respectively, a heat-sealable multilayer polypropylene-based resin film was obtained. The obtained multilayer film showed poor elasticity and insufficient tight-sealing property.

Comparative Example 3

In the same manner as in Example 1 except that 75 wt % of propylene homopolymer-1 and 25 wt % of propylene-ethylene-butene random copolymer-1 were used as the resin of substrate layer A, 60 wt % of propylene homopolymer-1 and 40 wt % of propylene-ethylene-butene random copolymer-1 were used as the resin of intermediate layer B, and the thickness of A/B/C structure was 10 μm, 28 μm and 2 μm respectively, a heat-sealable multilayer polypropylene-based resin film was obtained. The obtained multilayer film had poor tight-sealing property and the product protection performance was insufficient.

Example 2

In the same manner as in Example 1 except that, as a resin of intermediate layer B, 30 wt % of propylene homopolymer-2 and 70 wt % of propylene-ethylene-butene random copolymer-1 were used, a heat-sealable multilayer polypropylene-based resin film was obtained. The obtained multilayer film had sufficient seal strength, elasticity and tight-sealing property.

Example 3

In the same manner as in Example 1 except that 50 wt % of propylene-butene random copolymer-1 and 50 wt % of propylene-butene random copolymer-2 were used as a resin of thermal adhesion layer C, and the thickness of each of the A/B/C constitution was 30 μm, 4 μm and 1 μm, respectively, a heat-sealable multilayer polypropylene-based resin film was obtained. The obtained multilayer film had sufficient seal strength, elasticity and tight-sealing property.

Example 4

In the same manner as in Example 3 except that 0.45 wt % of polyoxyethylene(2)stearylamine monostearate, 0.11 wt % of N,Nbis(2 hydroxyethyl)stearylamine and 0.1 wt % of stearic acid monoglyceride were added to substrate layer A, and 0.4 wt % of stearic acid monoglyceride and 0.09 wt % of erucic acid amide were added to intermediate layer B, a heat-sealable multilayer polypropylene-based resin film was obtained. The obtained multilayer film had sufficient seal strength, elasticity and tight-sealing property.
In addition, the antifog property during packaging fruits and vegetables was also good.

TABLE 1

| resin | | | Example 1 | | Comparative Example 1 | | Comparative Example 2 | | Comparative Example 3 | |
|---|---|---|---|---|---|---|---|---|---|---|
| | layer A | kind | PP-1 | Pr-Et-Bu-1 | PP-1 | | PP-1 | Pr-Et-Bu-1 | PP-1 | Pr-Et-Bu-1 |
| | | mixing ratio | 70 | 30 | 100 | | 45 | 55 | 75 | 25 |
| | | resin Tm (° C.) | 158 | 133 | 158 | | 158 | 133 | 158 | 133 |
| | | Tm (° C.) of layer | 151 | | 158 | | 145 | | 152 | |
| | layer B | kind | PP-1 | Pr-Et-Bu-1 | PP-1 | Pr-Et-Bu-1 | PP-2 | Pr-Et-Bu-1 | PP-1 | Pr-Et-Bu-1 |
| | | mixing ratio | 10 | 90 | 10 | 90 | 50 | 50 | 60 | 40 |
| | | cold xylene portion (wt %) | 3.3 | 1.6 | 3.3 | 1.6 | 3.3 | 1.6 | 3.3 | 1.6 |

TABLE 1-continued

|  |  |  |  | | | | | | |
|---|---|---|---|---|---|---|---|---|---|
|  |  | Tm (°C) of layer |  | 136 | | 136 | | 146 | 148 |
|  |  | cold xylene portion (wt %) |  | 1.77 | | 1.77 | | 2.45 | 2.64 |
|  | layer C | kind | | Pr-Bu-1 | | Pr-Bu-1 | | Pr-Bu-1 / Pr-Bu-2 | Pr-Bu-1 |
|  |  | mixing ratio | | 100 | | 100 | | 50 / 50 | 100 |
|  |  | Tm (°C) | | 128 | | 128 | | 128 / 110 | 128 |
|  |  | Tm (°C) of layer |  | 128 | | 128 | | 120 | 128 |
| property | heat seal strength, film flow direction (N/15 mm) | | | 9.8 | | 7.6 | | 15.9 | 12.0 |
|  | heat seal strength, film flow orthogonal direction (N/15 mm) | | | 9.3 | | 6.8 | | 11.9 | 10.7 |
|  | tight-sealing property | | | ○ | | x | | △ | x |
|  | product handling performance | | | 4 | | 5 | | 2 | 4 |
| thickness | layer A (μm) | | | 28 | | 28 | | 30 | 10 |
|  | layer B (μm) | | | 5 | | 5 | | 4 | 28 |
|  | layer C (μm) | | | 2 | | 2 | | 1 | 2 |
|  | total | | | 35 | | 35 | | 35 | 40 |

| | | | | Example 2 | | Example 3 | | Example 4 | |
|---|---|---|---|---|---|---|---|---|---|
| resin | layer A | kind | | PP-1 | Pr-Et-Bu-1 | PP-1 | Pr-Et-Bu-1 | PP-1 | Pr-Et-Bu-1 |
| | | mixing ratio | | 70 | 30 | 70 | 30 | 70 | 30 |
| | | resin Tm (°C) | | 158 | 133 | 158 | 133 | 158 | 133 |
| | | Tm (°C) of layer | | 151 | | 151 | | 151 | |
| | layer B | kind | | PP-2 | Pr-Et-Bu-1 | PP-1 | Pr-Et-Bu-1 | PP-1 | Pr-Et-Bu-1 |
| | | mixing ratio | | 30 | 70 | 10 | 90 | 10 | 90 |
| | | cold xylene portion (wt %) | | 3.3 | 1.6 | 3.3 | 1.6 | 3.3 | 1.6 |
| | | Tm (°C) of layer | | 141 | | 136 | | 136 | |
| | | cold xylene portion (wt %) | | 2.11 | | 1.77 | | 1.77 | |
| | layer C | kind | | Pr-Bu-1 | | Pr-Bu-1 | Pr-Bu-2 | Pr-Bu-1 | Pr-Bu-2 |
| | | mixing ratio | | 100 | | 50 | 50 | 50 | 50 |
| | | Tm (°C) | | 128 | | 128 | 110 | 128 | 110 |
| | | Tm (°C) of layer | | 128 | | 120 | | 120 | |
| property | heat seal strength, film flow direction (N/15 mm) | | | 11.2 | | 14.9 | | 14.1 | |
| | heat seal strength, film flow orthogonal direction (N/15 mm) | | | 9.8 | | 11.4 | | 11.0 | |
| | tight-sealing property | | | ○ | | ○ | | ○ | |
| | product handling performance | | | 5 | | 4 | | 4 | |
| thickness | layer A (μm) | | | 28 | | 30 | | 30 | |
| | layer B (μm) | | | 5 | | 4 | | 4 | |
| | layer C (μm) | | | 2 | | 1 | | 1 | |
| | total | | | 35 | | 35 | | 35 | |

INDUSTRIAL APPLICABILITY

The heat-sealable laminate film of the present invention has sufficient heat seal strength for packaging heavy goods as a matter of course, is superior in handling property and shows good tight-sealing property. Thus, the film is preferably used as a packaging material for cereals such as wheat flour, rice, wheat and the like; root vegetables such as potato, radish, carrot and the like; plate or string konjacs; various pickles such as pickled radish, vegetables pickled in soy sauce or sake lees and the like; various bean pastes; jacket materials (e.g., concentrated soup, soup for Japanese noodle, soy sauce, sauce, ketchup, mayonnaise and the like); and collective package for packing several packages of Chinese noodle and the like together.

Moreover, the laminate film of the present invention can also be used as a packaging material for paper carton, tube, bag, cup, standing pack, tray and the like.

The invention claimed is:

1. A heat-sealable multilayer polypropylene-based resin film, which is an oriented polypropylene-based resin film made of a laminate of 3 or more layers comprising:
   (i) a substrate layer having a melting point of 155° C. or less and comprising a crystalline polypropylene-based resin and 20-50 wt % of a propylene-α-olefin copolymer;
   (ii) an intermediate layer comprising 65-95 wt % of a propylene-α-olefin copolymer having a cold xylene-soluble content of 3 wt % or less; and (iii) a thermal adhesion layer having a melting point of 150° C. or less;
wherein the substrate layer has a melting point higher than a melting point of the intermediate layer,
wherein the intermediate layer as a whole has a cold xylene-soluble content of 2.2 wt % or less and the intermediate layer has a thickness of 4 μm or above, and
wherein the thickness of the substrate layer is 30-89% of the total layer thickness, and the thickness of the thermal adhesion layer is 0.8-6 μm and 1-20% of the total layer thickness.

2. The heat-sealable multilayer polypropylene-based resin film of claim 1, wherein the intermediate layer as a whole has a cold xylene-soluble content of 1.77-2.11 wt %.

3. The heat-sealable multilayer polypropylene-based resin film of claim 1, wherein
the propylene-α-olefin copolymer contained in the substrate layer is a copolymer of propylene and an α-olefin other than propylene, which has 2 to 8 carbon atoms;
the intermediate layer has a melting point of 130-150° C.; and
the thermal adhesion layer comprises a random copolymer or block copolymer obtained by polymerizing two or more monomers selected from α-olefin-based monomers having 2 to 10 carbon atoms.

4. The heat-sealable multilayer polypropylene-based resin film of claim 1, wherein said intermediate layer comprises not less than 5 wt % of a thermoplastic resin having a melting point of not more than 150° C., which is a random copolymer or block copolymer obtained by polymerizing two or more monomers selected from the group consisting of α-olefin-based monomers having 2 to 10 carbon atoms.

5. The heat-sealable multilayer polypropylene-based resin film of claim 1, which is biaxially stretched.

6. A packaging material comprising the heat-sealable multilayer polypropylene-based resin film of claim 1.

* * * * *